(12) United States Patent
Kulmala et al.

(10) Patent No.: US 8,930,664 B2
(45) Date of Patent: Jan. 6, 2015

(54) METHOD AND APPARATUS FOR TRANSFERRING DATA FROM A FIRST DOMAIN TO A SECOND DOMAIN

(71) Applicant: Broadcom Corporation, Irvine, CA (US)

(72) Inventors: Ari Tapani Kulmala, Tampere (FI); Jaakko Illmari Sertamo, Tampere (FI)

(73) Assignee: Broadcom Corporation, Irvine, CA (US)

(*) Notice: Subject to any disclaimer, the term of this patent is extended or adjusted under 35 U.S.C. 154(b) by 160 days.

(21) Appl. No.: 13/763,960

(22) Filed: Feb. 11, 2013

(65) Prior Publication Data

US 2014/0052951 A1 Feb. 20, 2014

(30) Foreign Application Priority Data

Aug. 17, 2012 (GB) .................................. 1214748.4

(51) Int. Cl.
 *G06F 12/00* (2006.01)
 *G06F 3/06* (2006.01)
 *G06F 5/10* (2006.01)
 *G06F 13/16* (2006.01)
 *G06F 13/12* (2006.01)

(52) U.S. Cl.
 CPC .......... *G06F 3/0656* (2013.01); *G06F 13/1689* (2013.01); *G06F 13/124* (2013.01); *G06F 3/0644* (2013.01); *G06F 5/10* (2013.01); *G06F 2205/102* (2013.01)
 USPC ........... 711/165; 711/167; 711/173; 709/233; 709/242; 710/20; 710/28; 710/52; 710/57; 710/67; 712/13; 712/225

(58) Field of Classification Search
 CPC ... G06F 3/0644; G06F 3/0656; G06F 13/124; G06F 13/1689
 USPC .................. 711/165, 167, 173; 709/233, 242; 712/13, 225; 710/20, 28, 52, 57, 61
 See application file for complete search history.

(56) References Cited

U.S. PATENT DOCUMENTS 5,951,635 A 9/1999 Kamgar
6,247,082 B1 * 6/2001 Lo et al. ........................ 710/105
(Continued)

FOREIGN PATENT DOCUMENTS

GB 2482303 2/2012

OTHER PUBLICATIONS

Panades et al., "Bi-Synchronous FIFO for Synchronous Circuit Communication Well Suited for Network-on-Chip in GAKS Architectures", May 2007, IEEE, pp. 83-94.*

(Continued)

*Primary Examiner* — Reba I Elmore
(74) *Attorney, Agent, or Firm* — Stanton IP Law

(57) ABSTRACT

Data is written from a first domain to a FIFO memory buffer in a second domain. The first domain uses a first clock signal, the second domain uses a second clock signal and the memory buffer uses the first clock signal that is delivered alongside the data. The data is read from the memory buffer using the second clock signal. A read pointer is adjusted and synchronised with the delivered first clock signal. A token is generated using the delivered first clock signal, based on the read pointer. The token represents a capacity of the memory buffer having been made available. The token is passed to the first domain and synchronised with the first clock signal. The writing of data to the memory buffer is controlled based on a comparison between the synchronised token and a previously received token.

24 Claims, 4 Drawing Sheets

(56) References Cited

U.S. PATENT DOCUMENTS

| | | |
|---|---|---|
| 6,327,207 B1 | 12/2001 | Sluiter et al. |
| 6,882,661 B1 * | 4/2005 | Creedon et al. ............... 370/505 |
| 6,934,198 B1 | 8/2005 | Lowe et al. |
| 7,573,770 B1 | 8/2009 | Zhang et al. |
| 8,417,982 B1 * | 4/2013 | Amit et al. .................... 713/400 |
| 2001/0042219 A1 * | 11/2001 | Robertson .................... 713/400 |
| 2003/0164836 A1 | 9/2003 | Tang et al. |
| 2004/0161067 A1 * | 8/2004 | Kim et al. .................... 375/354 |
| 2004/0255188 A1 | 12/2004 | Lo |
| 2011/0116337 A1 * | 5/2011 | Hay et al. ................. 365/233.11 |

OTHER PUBLICATIONS

Simulation and Synthesis Techniques for Asynchronous FIFO Design; Clifford E Cummings, Sunburst Design, Inc.; SNUG San Jose 2002; Rev. 1.2.

* cited by examiner

METHOD AND APPARATUS FOR TRANSFERRING DATA FROM A FIRST DOMAIN TO A SECOND DOMAIN

CROSS REFERENCE TO RELATED APPLICATION

This application claims the benefit under 35 U.S.C. §119 (a) and 37 CFR §1.55 to UK patent application no. 1214748.4, filed on Aug. 17, 2012, the entire content of which is incorporated herein by reference.

TECHNICAL FIELD

The present invention relates to a method and apparatus for transferring data from a first domain to a second domain.

BACKGROUND

When designing a system-on-chip or integrated circuit (IC), there are numerous design considerations that must be taken into account, including for example clock frequency and power supply to various parts of the chip or circuit.

Ideally, a synchronous system is employed in circuit design, whereby the same clock signal is distributed to the circuit components in a patterned configuration, commonly known as a clock tree, in order that all of the circuit components of the circuit can receive the same clock signal in a synchronous manner (where designed to do so). As all of the components are configured to use the same clock signal, communication problems between the circuit components can be reduced (i.e. signals between components do not arrive on unexpected clock cycles). Many factors must be taken into account when designing the clock tree, such as clock skew, whereby the clock signals on separate branches of the clock tree are designed to arrive at the same time at different corresponding points but actually arrive at different times, the difference being a skew between times of arrival. These considerations place a burden on the design manufacturing process and also make it difficult for a chip, having multiple functions and processes, to be designed in a cost-effective and timely manner.

The design layout of the chip and distribution of clock signals has been made even more difficult due to many chip designs having multiple "power domains", whereby different areas of the chip are isolated and controlled with a switch that can cut off the voltage supply to that area of the chip. Multiple power domains can be used, for example, to address the problem of transistor leakage current in chips, whereby transistors leak current even when not active. This leakage current becomes even more of a problem as transistors get smaller and the number of transistors on a chip increase, and therefore the leakage current contributes significantly to the entire current consumption of the chip. The power domain switches can therefore be used to cut off the voltage supply to each power domain in order to suppress this current leakage. Some power domains are arranged so that they have different operating voltages thereby forming voltage domains. These can be used for further reduction in total power consumption. The voltage domains can have lower frequency components and lower voltages, which leads to a lower power consumption. However, a drawback to using voltage domains is that voltage level shifters are required in order to match the signal voltage levels at the boundaries between each voltage domain.

If designing a chip using a synchronous system, the design of these individual power domains would be heavily constrained due to having to conform to the design of the synchronous clock tree. It is therefore commonplace to design power domains so that they are asynchronous with respect to one another (i.e. they run at different clock speeds or frequencies, and/or the clock signals used in each power domain have different unknown phase offsets), therefore reducing the complexity of the clock tree design (as a full chip balanced (synchronous) clock tree is not required, which would be complex and would consume large amounts of power). This means that the overall design and manufacture process is quicker and more cost-effective.

In order for the different asynchronous domains (such as power domains or voltage domains, or indeed other regions or domains that simply run at different clock speeds or at least that are otherwise not synchronous with each other) to communicate with each other (i.e. so that data can be passed between the different domains). First-In-First-Out (FIFO) modules can be used to bridge between at least two of the asynchronous domains. FIFOs are modules, circuit components, circuit arrangements, software algorithms, data structures or logical arrangements, whether physical or otherwise, that enable data to be written to and read from a memory buffer. FIFOs are arranged so that the first data value written to the memory buffer will be the first data value that is read from the memory buffer, the second data value written to the memory buffer will be the second data value that is read from the memory buffer, etc.

In an asynchronous circuit design (i.e. a chip in which the different clock domains, sometimes due to the formation of power domains, are clocked at different speeds and/or have an unknown phase relationship with respect to each other), timing becomes an issue for a FIFO that bridges between the two asynchronous domains, because the write speed may differ from the read speed and therefore there is a risk of overflow or underflow and circuit malfunction. The asynchronous crossing creates an unwanted latency. Overflow is where data is lost due to the write speed being quicker than the read speed such that, when a memory buffer of the FIFO is filled, all of the excess data values that cannot be written to the already-full memory either overwrite other data values that have yet to be read or are lost. Underflow is where the write speed is slower than the read speed such that the capacity of the FIFO memory buffer is in excess such that the FIFO is not working at an optimum rate. The overflow and underflow situations therefore have deleterious effects on the chip requirements of throughput and latency.

Synchronisers are used to synchronise exchanged data between the different domains. The synchronisers enable the domains to communicate with each other more reliably but have a tendency to cause delays in the circuit whilst synchronising data. Therefore, for example, an indication signal representative of when the FIFO memory buffer is full sent from a FIFO memory buffer in a first domain to a FIFO write module in a second domain that is asynchronous with the first domain would be delayed as the indication signal is synchronised from one domain to the other. Due to this delay, an overflow of the FIFO memory buffer could occur until the indication signal is received.

SUMMARY

In a first exemplary embodiment of the invention, there is a method of transferring data from a first domain to a second domain, the method comprising; writing data from the first domain to a first-in first-out (FIFO) memory buffer in the second domain, the first domain operating using a first clock signal, and the second domain operating using a second clock signal that is different from the first clock signal, wherein the memory buffer operates using the first clock signal that is delivered alongside the data from the first domain to the second domain in a source synchronous manner; reading, using the second clock signal, the data from the memory buffer; adjusting a read pointer based on the reading of the data from the memory buffer; synchronising the adjusted read pointer so that it is synchronous with the delivered first clock signal; generating in the second domain, using the delivered first clock signal, a token representative of a capacity of the memory buffer having been made available, the token being based on at least the adjusted read pointer; passing the token from the second domain to the first domain and synchronising the token using the first clock signal; and comparing the synchronised token with a previously received token; wherein the writing of data from the first domain to the memory buffer in the second domain is controlled based on at least said comparison.

In a second exemplary embodiment of the invention, there is an apparatus for transferring data from a first domain, the first domain being constructed and arranged to use a first clock signal, to a second domain, the second domain being constructed and arranged to use a second clock signal that is different from the first clock signal, the apparatus comprising: a first-in first-out (FIFO) memory buffer located in the second domain; a FIFO write module located in the first domain, the FIFO write module being constructed and arranged to write data to the FIFO memory buffer, wherein the memory buffer operates using the first clock signal that is delivered alongside the data from the first domain to the second domain in a source synchronous manner; a FIFO read module located in the second domain, the FIFO read module being constructed and arranged to: read, using the second clock signal, the data from the FIFO memory buffer; and adjust a read pointer based on the reading of the data from the FIFO memory buffer; a first synchroniser module located in the second domain, the first synchroniser module being constructed and arranged to synchronise the adjusted read pointer with the delivered first clock signal; a token generator module located in the second domain, the token generator module being constructed and arranged to generate, using the delivered first clock signal, a token representative of a capacity of the FIFO memory buffer having been made available, the token being based on at least the adjusted read pointer; a second synchroniser module located in the first domain, the second synchroniser module being constructed and arranged to receive the token from the second domain and synchronise the token using the first clock signal; and wherein the FIFO write module is constructed and arranged to compare the synchronised token with a previously received token; wherein the writing of data from the first domain to the FIFO memory buffer in the second domain is controlled based on at least said comparison.

Further features and advantages of the invention will become apparent from the following description of preferred embodiments of the invention, given by way of example only, which is made with reference to the accompanying drawings.

DETAILED DESCRIPTION

Figure 1:
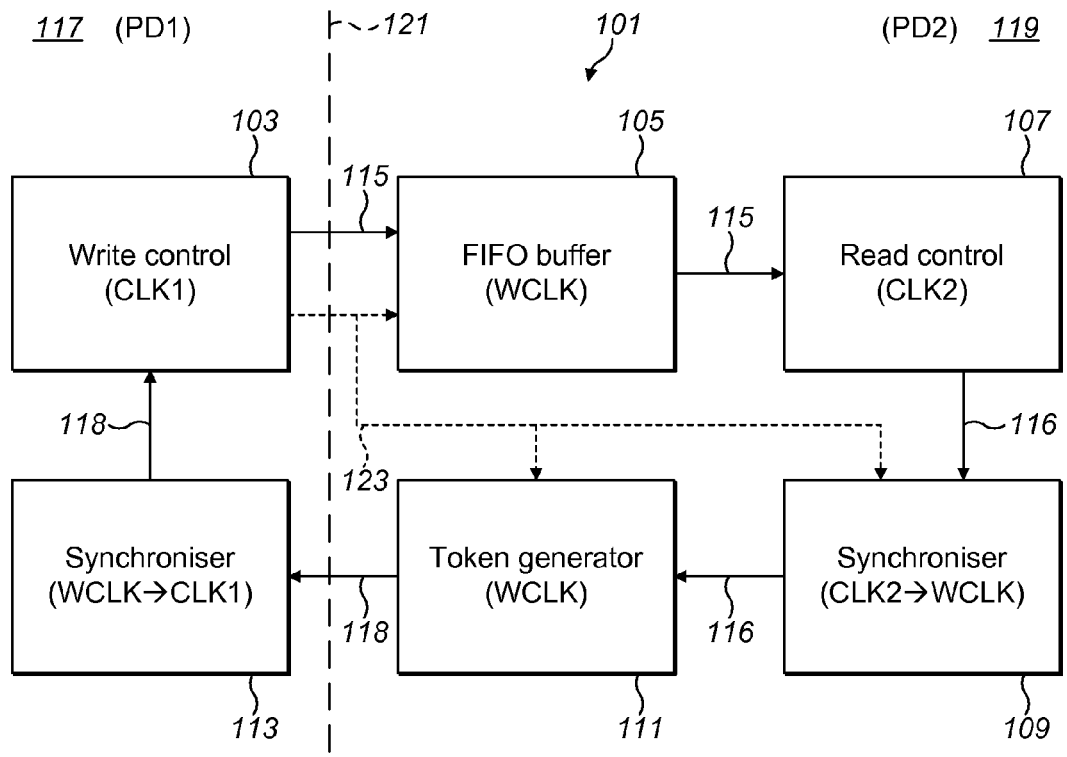
FIG. 1 shows a schematic block diagram of an example of an apparatus according to an embodiment of the present invention.

Sending tokens that are representative of a capacity of the memory buffer having been made available or free to the first domain allows a write operation (i.e. writing of data) to be controlled. More particularly, basing the write operation on a comparison between the currently received and previously received tokens enables the write operation to take into account any events (i.e. tokens) missed due to the synchronisation process. This is advantageous as the write operation can thereby cope with missed events and delays caused by the synchronisation process.

As the data and first clock signal are delivered alongside each other from the first domain to the second domain in a source-synchronous manner, and the FIFO memory buffer uses the delivered first clock signal, there is no need to synchronise the data with the second clock signal of the second domain for the purposes of writing to the FIFO memory buffer. Therefore there is no synchronisation delay when writing data to the FIFO memory buffer. The delivered first clock signal may however have a phase that is unknown relative to the first clock signal and therefore, when transferring data across from a component operating at the delivered first clock signal to another component operating at the first clock signal, synchronisation is needed to account for this unknown phase difference.

The token may be encoded before synchronisation, using a numbering format that has a Hamming distance of one between adjacent numbers. The encoded token of this embodiment may then be decoded after synchronisation. The numbering format may, for example, be Gray code and more particularly, may take the form of a two-bit Gray code. As the Hamming distance is one, there is, for example, a single value change between adjacent values of the numbering format used and therefore spurious values of the token are prevented from being output from the synchronisation operation. Using a two-bit Gray code encoded token through synchronisation allows a difference to be calculated between the received token and the previously received token up to at least 0, 1, 2 or 3. Similarly, the read pointer may be encoded and decoded using the numbering format before and after synchronisation.

In an embodiment, the generating of the token is based on the adjusted read pointer and a previously stored read pointer. This advantageously allows a determination of whether a read pointer has been incremented due to data being read from the FIFO memory buffer.

In an embodiment, the first clock signal has at least one characteristic that is different from a corresponding characteristic of the second clock signal. The characteristic may be at least one of a clock frequency and a clock phase. Such domains are asynchronous with respect to one another. As the domains are asynchronous with respect to one another, each domain can be designed independently thus increasing the speed and ease of design and manufacture of an overall chip.

In an embodiment, the token is generated using a finite state machine. The finite state machine allows multiple states to be output based on the compared read pointer values obtained from the register and from the second domain. The token generation can therefore be output quickly and efficiently.

In an embodiment, a token counter is adjusted based on the comparison of the received token and the previously received token. The token counter may be in the first domain. Maintaining a token counter allows the first domain to be aware of the number of memory slots determined to have been freed from the memory buffer located in the second domain. The token counter is therefore indicative of the number of write operations or "writes" that can be performed.

The first domain may comprise a first power domain and the second domain may comprise a second power domain. The first domain may comprise a first voltage domain and the second domain may comprise a second voltage domain. Using separate power or voltage domains allows separate power or voltage control of each domain such that, when a domain is inactive, the power or voltage supplied to that domain can he cut off. This can reduce power leakage around the circuit and therefore reduce the overall power consumption of the circuit.

FIG. 1 illustrates an example of circuitry having a FIFO 101 and other circuitry components providing for token-based flow control. In particular, FIG. 1 shows a FIFO 101 comprising a write control module 103, a FIFO memory buffer 105 and a read control module 107. Also shown is a first synchroniser 109, a token generator 111 and a second synchroniser 113.

The components of the FIFO 101 are generally placed either in a first domain, such as a first power domain (PD1) 117, or in a second domain, such as a second power domain (PD2) 119, the power domains 117, 119 being notionally separated by a power domain boundary 121. The first and second domains 117, 119 could, in other examples, be voltage domains, or in general any domains that are asynchronous with respect to one another, regardless of the power or voltage requirements. The domains may be asynchronous because they operate at different clock speeds or frequencies, and/or because the different clock signals used to clock the different domains have different unknown phase offsets. Domains that are clocked at the same frequency but which have an unknown phase with respect to each other are said to be mesochronous.

In more detail, the write control module 103 of the FIFO 101 and the second synchroniser 113 are placed in PD1 117. The FIFO memory buffer 105, the read control module 107, the first synchroniser 109 and the token generator 111 are placed in PD2 119. The power domains 117, 119 are asynchronous in at least clock frequency such that PD1 117 is generally clocked using a first clock signal at a first clock frequency (CLK1) and PD2 119 is generally clocked using a second clock signal at a second clock frequency (CLK2) which is different from CLK1. The power domains 117, 119 may also he asynchronous in phase.

The circuitry components are arranged so that the FIFO 101 has a token-based flow control, whereby, after a write control operation has been initiated, tokens are generated by the circuitry components to indicate, based on a read pointer from the FIFO 101, whether a memory slot of the FIFO memory buffer 105 is available for a further write operation to occur. In particular, the write control module 103 is operable to write data values 115 to the FIFO memory buffer 105. The FIFO memory buffer 105 is operable to temporarily store the data values 115 received from the write control module 103 during the transition from when the data values 115 are written to the buffer 105 to when they are read from the buffer 105. The read control module 107 is operable to read or free the data values 115 from the FIFO memory buffer 105 and thereby release the data values 115 from the buffer 105. The data values 115 from the write control module 103 are written across the power domain boundary 121 to the FIFO memory buffer 105 in a source-synchronous manner, such that the first clock signal (CLK1) is delivered alongside the data values 115 to the FIFO memory buffer 105. Therefore, despite being present in PD2 119 which generally operates at the second clock frequency (CLK2), the FIFO memory buffer 105 is made to operate at the same clock frequency of PD1 117. However, the first clock signal and data values 115 have a tendency to experience phase-shifts as they cross the power domain boundary 121 and therefore the skew between the clock signal and data values 115 needs to be controlled. This is controlled by designing the layout of the circuit to compensate for the skew. The layout may be designed using logic synthesis or clock tree design. The first clock signal, having crossed the power domain boundary 121, is known as the write clock signal 123, which is characterised by the same first clock frequency (which, for simplicity of explanation, is called the write clock frequency (WCLK)) as the first clock signal. As the data values 115 are written across the power domain boundary 121 from PD1 117 to PD2 119 in a source-synchronous manner, the data values 115 can be correctly written to the FIFO memory buffer 105 with maximum throughput and minimum latency. The circuitry components in the second domain that are clocked using WCLK form a write clock domain (not shown) that in general is mesochronous with respect to PD1 117.

The FIFO memory buffer 105 effectively receives the data values 115 and temporarily stores the data values 115 ready for outputting upon a read operation being performed. The FIFO memory buffer 105 works in a first-in, first-out manner whereby the order of the data values 115 written to the buffer 105 is maintained so that whichever data value 115 is first written to the buffer memory 105 is the first output value upon a read operation, whichever second data value is written to the buffer memory 105 is the next data value that is read out, and so on.

The read control module 107 is operable to perform a read operation at a second clock frequency (CLK2), different from the write clock frequency (WCLK), whereby the data values 115 stored in the FIFO memory buffer 105 are read out from the buffer 105. In response to the read operation, the FIFO memory buffer 105 outputs the data value 115 that is next in the output sequence, which output sequence is dependent on the input order of the data values 115. The FIFO memory buffer 105 is thereby "freed" of the read data value 115. At substantially the same time as the data value 115 is read from the memory buffer 105, a value of a read pointer is adjusted. The read pointer points to a memory slot containing the next data value that is to be read from the memory buffer 105 and is therefore incremented every time that data has been read from the memory buffer 105 until it has reached a maximum value where the read pointer then resets in order to begin reading from the beginning memory slot of the memory buffer 105. The read pointer is in a decimal format which is representative of a binary sequence.

Following the read operation, the current read pointer value 116 is transferred to a first synchroniser module 109 so that it is synchronised from the second clock frequency (CLK2) to the write clock frequency (WCLK).

When transferring the read pointer value 116 to the first synchroniser module 109 and synchronising the read pointer value 116 from the second clock signal (CLK2) to the write clock signal (WCLK), spurious read pointer values may be output. This spurious read pointer output occurs due to each bit of the multiple-bit decimal read pointer that is sampled on a clock cycle being susceptible to a change of value at different times during the synchronisation, and therefore many permutations of the bit values can be output as an incorrect representation of the read pointer value input to the first synchroniser module 109. The spurious values are problematic because they could give false indications of the number of free memory slots of the FIFO buffer 105 and, if the write operation is dependent on the spurious value, lead to failure of the circuit. To prevent the outputting of spurious read pointer values, it is preferable to encode-decode the read pointer values before and after synchronisation so that, instead of being provided in a decimal form having multiple bit changes between adjacent values, the read pointers are in a form where there is a single bit change between adjacent values. Having a single bit change between adjacent read pointer values prevents spurious values from being output by the synchroniser because not every bit will change during an increment of the read pointer. An example of such encoding-decoding method is Gray-coding. As Gray code defines a modified binary sequence whereby only a single bit change is apparent between adjacent number representations, the outputting of spurious values due to the latency of the first synchroniser module 109 will be prevented. Indeed, in general, any other method of encoding and decoding that uses a system having a Hamming distance (i.e. the number of flipped bits in a fixed length binary word) of one between adjacent values can be employed to prevent spurious output from the first synchroniser module 109.

The synchronised read pointer value 116 is then passed to the token generator module 111, which is clocked at the write clock frequency (WCLK). The token generator module 111 stores the most recent previous read pointer value and is operable to compare the previously stored read pointer value with the current read pointer value 116 (i.e. the read pointer value 116 received from the first synchroniser module 109) and generates a token 118 based on the comparison, which token is output on a clock cycle so that only one token is output per clock cycle in this example. The comparison comprises determining the difference between the current read pointer value and the previous read pointer value. The generated token 118 is therefore indicative of an available capacity of the FIFO memory buffer 105. More specifically, in one example, the token 118 is indicative that a single data value has been read from the FIFO memory buffer 105 and that a corresponding memory slot of the memory buffer 105 is therefore available to be written to. Alternatively or additionally, the token 118 may indicate the number of memory slots in the memory buffer 105 that are available.

The token 118 is then transmitted across the power domain boundary 121 to the second synchroniser module 113. The second synchroniser module 113 receives the token 118 and synchronises it with the first clock signal (CLK1). As the write clock signal (WCLK) and first clock signal (CLK1) have the same frequency in this example, the second synchroniser module 113 is used to correct any phase offset (which is generally unknown) between the token 118 and the first clock signal (CLK1). The second synchroniser module 113 then passes the synchronised token to the write control module 103. As with the first synchroniser module 109, the second synchroniser module 113 could produce spurious output values, and therefore Gray coding may be employed, to encode the token before passing to the second synchroniser module 113 in order to prevent spurious values from being output. The token may then be decoded after synchronisation.

The write control module 103 receives the token 118 and adjusts or updates its token counter (shown in FIG. 3) based on a comparison between the received token 118 and a previously received token. The token account is populated by subtracting a previously received token from the currently received token and then adding the resulting difference to the existing value of the token account. The write control module 103 uses the token counter to determine whether or not a new write operation can be made. The token account value is decremented by one for each write operation issued by the write control module 103. The overall effect of this write control with token generation and synchronisation prevents or minimises any overflow or underflow from occurring at the memory buffer 105. The write operation can therefore be performed at its optimum speed based on the token-based flow control.

When synchronising the generated token 118 from the token generator 111, using the second synchroniser module 113, one or more generated tokens may be "missed" by the second synchroniser module 113. In practice, using a two-stage synchroniser having two cascaded flip flops, the second synchroniser module 113 could miss up to two or possibly even three tokens corresponding to two or three clock cycles. This can be due to, for example, an input signal (i.e. token) arriving at the second synchroniser module 113 close to the clock edge at which the input signal is sampled, when the flip flop(s) in the synchroniser module 113 is settling and so "misses" the input signal.

Therefore, in order to avoid or reduce the possibility of any underflow or overflow due to missing an event (i.e. missing a token on a clock cycle at the second synchroniser module 113), the tokens in an example are provided as two-bit signals. The tokens are provided as two-bit signals so that, when the write control module 103 compares the received token with a previously received token stored in the write control module 103, the write control module 103 is able to determine whether the difference between the received token and previously received token is either 0, 1, 2 or 3, and thereby give an indication of the number of tokens missed by the second synchroniser module 113. If the tokens were not to be encoded in this way and spurious token values were to be output during synchronisation, then the determined difference between the received token and previously received token would be a false representation of the number of missed tokens, and thus the write control module would be provided with false write permits or tokens. The determined difference is then added to the stored token account in order that the write control module 103 determine a more accurate approximation of the available or freed capacity of the memory buffer 105 and hence can determine whether or not to perform a write operation based on the token account. The token account therefore compensates for events missed by the second synchroniser module 113 and provides an indication of how many memory slots of the memory buffer 105 have been made available due to one or more read operations having been performed. The token account is decremented by a single value for each data value written (i.e. an issued write) to the FIFO memory buffer 105 so that, once a freed memory slot of the memory buffer 105 has been written to, no further writes will be made until the token account or counter is incremented.

Figure 2:
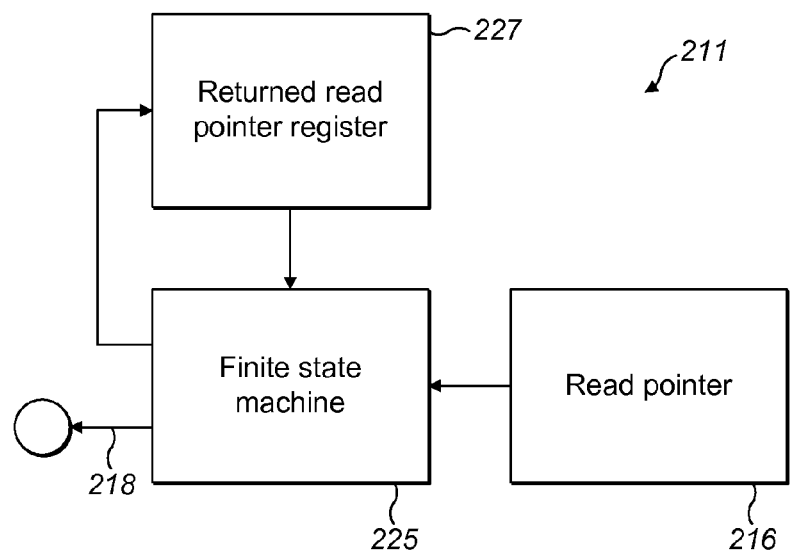
FIG. 2 shows schematically how tokens are generated in the example of FIG. 1.

The token generator 111 is shown in more detail at FIG. 2. As shown, the token generator 211 comprises a finite state machine (FSM) 225, a returned read pointer register 227 and a current read pointer value input 229. The register 227 stores previous read pointer values according to the data values 115 that have been read from the memory buffer 105. The FSM 225 compares the current read pointer value from input 229 with the previous read pointer value obtained from the register 227. The FSM 225 determines if there is a difference between the two obtained read pointer values and, if there is a difference, the FSM 225 changes its state and generates a token 218 representative of the FSM 225 state, which generated token 218 is output to second synchroniser module 113 so that only one token 218 is output per clock cycle. The generated token 218 represents a single increment of the read pointer. If there is no determined difference between the current read pointer value and the previous read pointer value then the FSM determines that the read pointer has not been incremented and therefore does not generate any tokens for output. When an FSM 225 state change occurs, the register 227 is incremented by a single value. The FSM 225 transmits the generated token 218 to the second synchroniser module 113.

Figure 3:
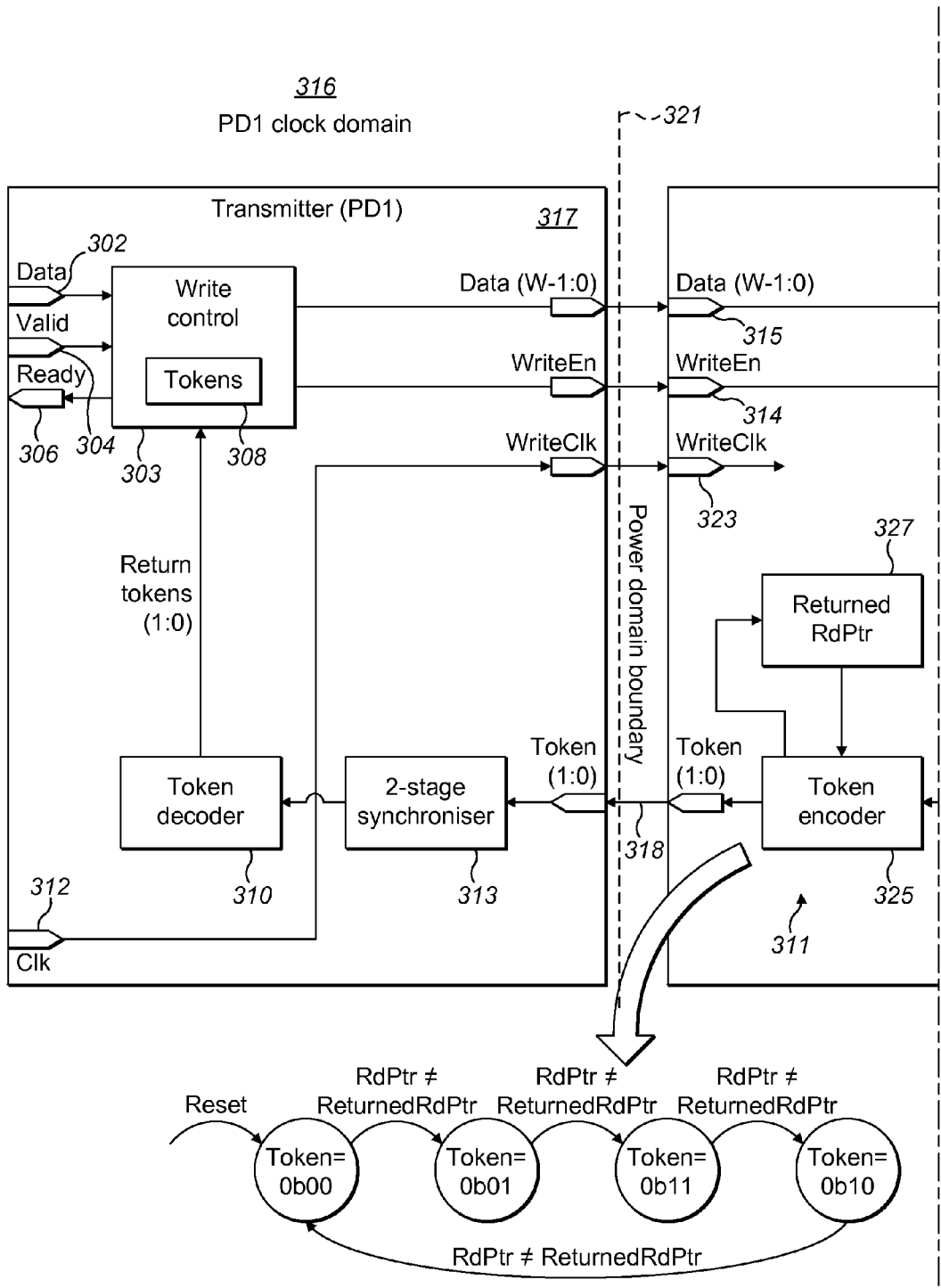
FIG. 3 shows a circuit diagram of a second example of an apparatus according to an embodiment of the present invention.
Figure 3:
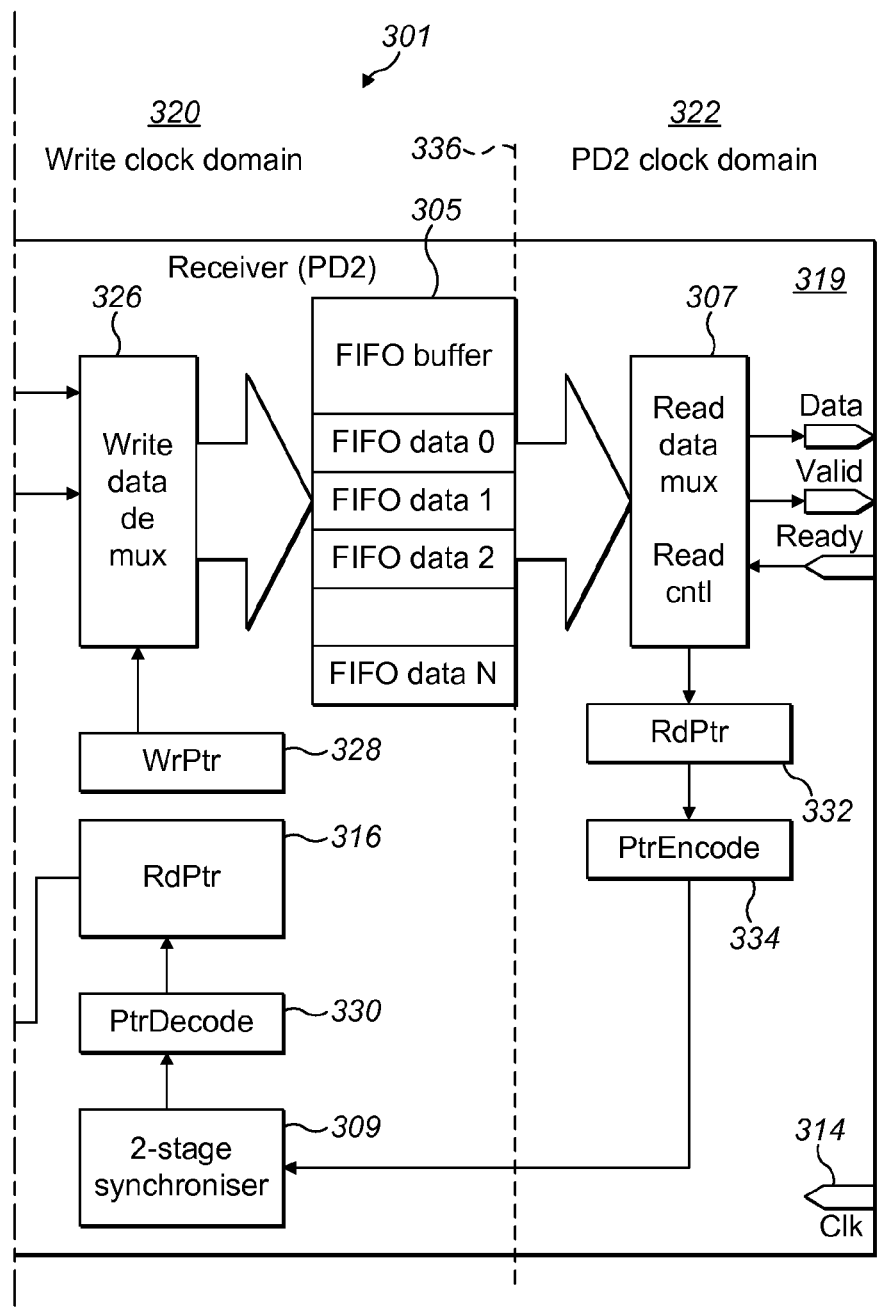

FIG. 3 shows schematically a second example of an embodiment of the present invention. FIG. 3 shows circuitry components, including a FIFO 301 that bridges between a first power domain (PD1) 317 and a second power domain (PD2) 319, the power domains 317, 319 being separated notionally by a power domain boundary 321. As before, the domains 317, 319 need not be power domains but may instead or in addition be other forms of domain, such as voltage domains for example. The domains 317, 319 are asynchronous with respect to one another such that the clock signals used to clock each domain 317, 319 have at least one differing characteristic, such as clock speed or frequency, or phase offset (which may be unknown).

The circuitry components present in PD1 are generally termed the "transmitter". The circuitry components present in PD2 are generally termed the "receiver". The transmitter comprises a write control module 303 of the FIFO 301, a token decoder 310 and a second two-stage synchroniser 313. The receiver comprises a write data demultiplexer 326, a FIFO memory buffer 305, a read data multiplexer and read control module 307, a read pointer 332, a read pointer encoder 334, a first two-stage synchroniser 309, a read pointer decoder 330, a second read pointer 316, a write pointer 328, a token encoder 325 (which employs an FSM) and a returned read pointer register 316.

The write control module 303 further comprises a token account or counter 308 which enables the write control module 303 to determine whether a write operation can occur. The write operation is enabled by propagating a write request (Valid) 324 to a write enable signal 324 which is passed across the power domain boundary 321 to the write demultiplexer 326. The write request (Valid) 324 signal is propagated to the write enable signal 324 if there is space in the FIFO memory buffer 305 as determined by the received tokens, which are different from the generated tokens, as discussed further below.

The transmitter is generally clocked at or employs a first clock frequency using first clock signal 312. PD2 319 and some of the receiver components in PD2 319 are generally clocked at a second clock frequency that is different from the first clock frequency using second clock signal 314. Many of the circuitry components present in PD2 319 are clocked using a write clock signal 323. The write clock signal 323 is derived from the first clock signal 312 and crosses the power domain boundary 321 alongside the write data signals 315 and write enable signals 324 from the write control module 303 in a source-synchronous manner. The write clock signal 323 has the same clock frequency as first clock signal 312 but has an unknown phase with respect to the first clock signal 312 and therefore the write clock signal 323 is mesochronous with the first clock signal. As such, no synchronisation of clock frequency is required when crossing the power domain boundary 321 because the data values 315 are operational at the write clock frequency and the circuitry components receiving the data values 315 are also being operated at the same write clock frequency.

The components that are clocked or operate at the different clock frequencies are notionally represented by different clock domains. The components operating at the first clock frequency are depicted as being placed in the PD1 clock domain 316, which is similar to the area defined by PD1 317, which comprises all of the transmitter components. The components operating at the write clock frequency 323 are depicted as being in the write clock domain 320 (a subset of PD2 319), defined as the region between power domain boundary 321 and virtual clock boundary 336. The components operating at the second clock frequency are depicted as being in the PD2 clock domain 322 (a subset of PD2 319), defined as the region to the right side of virtual clock boundary 336 in FIG. 3.

Figure 4:
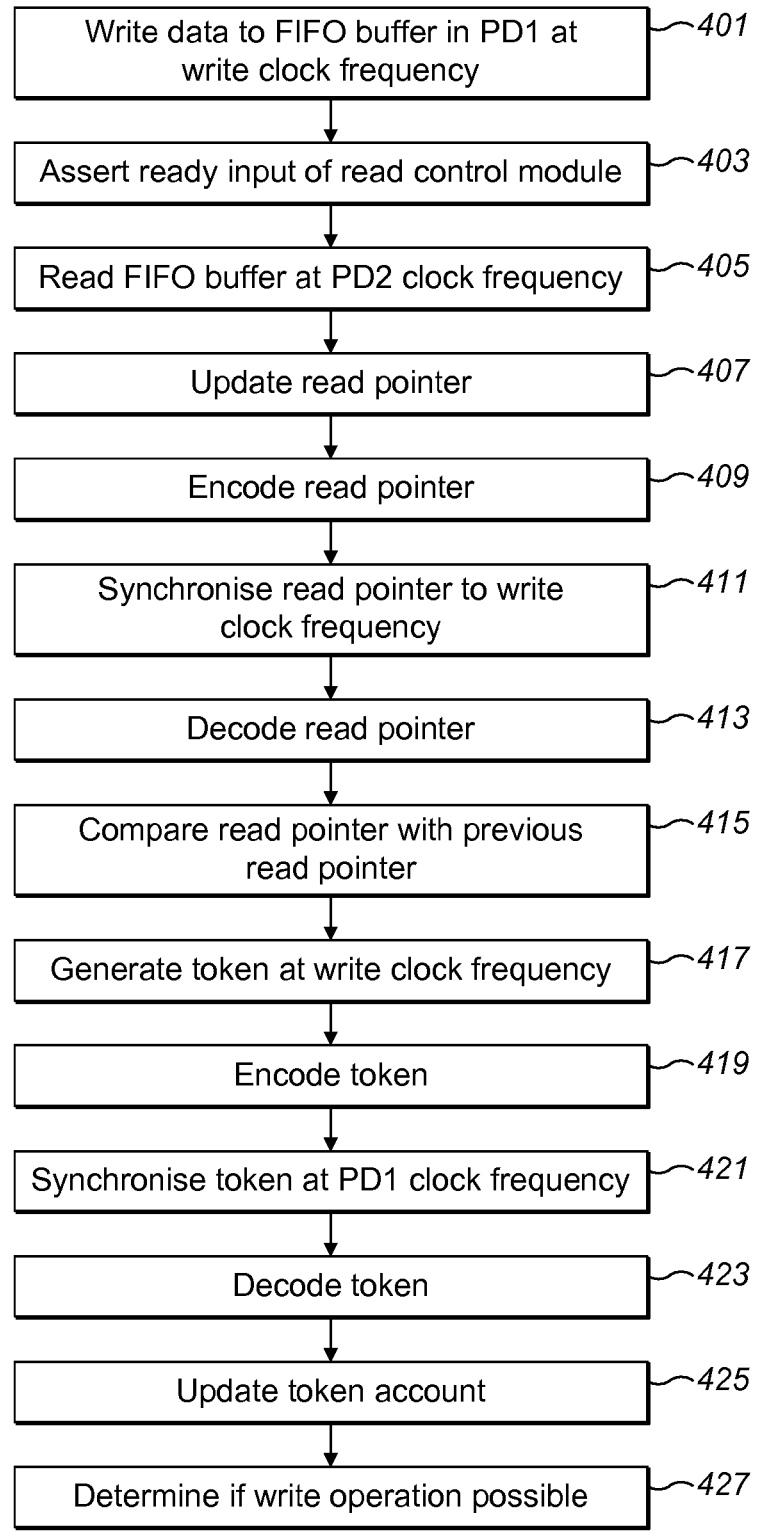
FIG. 4 shows a schematic state flow diagram of the processes that occur in the example of FIG. 3.

The operation of the FIFO of FIG. 3 will now be described with reference to the state flow diagram of FIG. 4. At step 401, a write operation is initiated by the write control module 303 using the first clock signal 312 at the first clock frequency. The write operation is typically initiated in response to receipt or assertion of a "valid" signal 304 which requests that the write operation be initiated when it is desired to transmit data from PD1 317 to PD2 319. In response to receiving the valid signal 304, and assuming the received tokens, and more particularly, the token account discussed further below indicate that there is space available in the FIFO memory buffer 305, the write enable signal 324 is transmitted to the write demultiplexer 326. Data values 315 are also sent to the write demultiplexer 326 for writing to the FIFO memory buffer 305. The write demultiplexer 326 is used to control which slots in the FIFO memory buffer 305 that the data values 315 are written to, based on the write pointer 328. The data values 315 are then written to the FIFO memory buffer 305 where they are temporarily stored until a read operation is performed. At step 403, the ready signal 306 at the write control module 303 is asserted in response to the transmission of the write enable signal 324. This ready signal 306 is asserted on the same clock cycle as when the write enable signal 324 is transmitted. The ready signal 306 is thereby transmitted to the read control module 307 to indicate that data values 315 have been written to the FIFO memory buffer 305, thereby enabling the read control module 307 to perform a read operation. At step 405, the FIFO memory buffer 305 is read at the second clock frequency by the read control module 307, which effectively frees the read data value 315 from the buffer 305 by absorbing them into a bus interface of the read control nodule 307.

The FIFO read pointer 332 is incremented by a single value for each read operation as shown in step 407. The read pointer 322 is then encoded by read pointer encoder 334 at step 409 in this example using two-bit Gray coding. At step 411, the encoded read pointer is then synchronised from the second clock frequency to the write clock frequency using first two-stage synchroniser 309, the two-stage synchroniser comprising two cascaded flip flops for each bit of the encoded read pointer. After being synchronised, the read pointer is then decoded at step 413 using read pointer decoder 330. At step 415, the read pointer value is then compared at the token encoder 325 with a previous read pointer value obtained from register 327. The token encoder 325 generates a token 318 at the write clock frequency at step 417, assuming that there is a difference between the current and previous read pointer values based on the comparison. Then, at step 419, the token encoder 325 encodes the generated token 318, in this example using two-bit Gray coding again, and outputs the token 318 to the transmitter. The token value increments by a single value for each determined increment of the read pointer and in one example cycles through the following sequence for each increment: 0b00; 0b01; 0b11; 0b10.

At step 421, the transmitter synchronises the token 318 with the first clock frequency using a second two-stage synchroniser 313. The second two-stage synchroniser 313 comprises two cascaded flip flops per bit. The synchronised token 318 is then decoded at step 423 using the token decoder 310 before being passed on to write control module 303. At step 425, the write control module 303 receives the token and updates its token account 308 based on a comparison, and more specifically a difference, between the received token with the previously received token. The write control module 303 determines at step 427, based on its token account 308, whether or not a further write operation can occur and therefore can decide whether or not to propagate a write request (Valid) 304 to the write enable signal 324.

As above, the two-bit Gray code encoding is used so that, when the write control module 303 compares the received token with a previous token stored in a token account 308, the write control module 303 is able to determine whether the difference between the received token and previously received token is either 0, 1, 2 or possibly even 3, and thereby give an indication of the number of tokens missed by the second synchroniser module 313. This difference is added to the stored token account 308 in order that the write control module 303 determines a more accurate representation of the available or freed capacity of the memory buffer 305 and hence can determine whether or not to perform a write operation based on the token account 308. The token account 308 therefore compensates for events missed by the second synchroniser module 313 and provides an indication of how many memory slots of the memory buffer 305 have been made available due to one or more read operations having been performed. The token account 308 therefore in effect holds "write permits" whereby each single increment of the token account 308 corresponds to a write permit that will permit the write control module 303 to perform a single write operation.

The write request (Valid) 304 signal is propagated to the write enable signal 324 if there is space in the FIFO memory buffer 305 based on the token account 308. As the write control module 303 is regularly informed of when there is an available capacity in the memory buffer 305, it can determine whether or not to issue a new write (i.e. perform a write operation). In this manner, the FIFO can overcome the deleterious effects caused by the second synchroniser module 313. When a write operation is performed, the token account 308 is decremented by a single value for each write, indicating that the memory slot for which the write was issued is no longer available.

The above embodiments are to be understood as illustrative examples of the invention. Further embodiments of the invention are envisaged.

For example, in the above embodiment, an encoding and decoding process occurred before and after synchronisation using Gray coding. In other embodiments, a different coding scheme can be used to overcome problems associated with possible spurious output signals.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transferring data from a first domain to a second domain, the method comprising:
writing data from the first domain to a first-in first-out (FIFO) memory buffer in the second domain, the first domain operating using a first clock signal, and the second domain operating using a second clock signal that is different from the first clock signal, wherein the memory buffer operates using the first clock signal that is delivered alongside the data from the first domain to the second domain in a source synchronous manner;
reading, using the second clock signal, the data from the memory buffer;
adjusting a read pointer based on the reading of the data from the memory buffer;
synchronising the adjusted read pointer so that it is synchronous with the delivered first clock signal;
generating in the second domain, using the delivered first clock signal, a token representative of a capacity of the memory buffer having been made available, the token being based on at least the adjusted read pointer;
passing the token from the second domain to the first domain and synchronising the token using the first clock signal; and
comparing the synchronised token with a previously received token;
wherein the writing of data from the first domain to the memory buffer in the second domain is controlled based on at least said comparison.

2. A method according to claim 1, wherein the token is encoded, before synchronisation, using a numbering format that has a Hamming distance of one between adjacent numbers.

3. A method according to claim 2, wherein the encoded token is decoded after synchronisation.

4. A method according to claim 1, wherein the read pointer is encoded before synchronisation using a numbering format that has a Hamming distance of one between adjacent numbers.

5. A method according to claim 4, wherein the encoded read pointer is decoded after synchronisation.

6. A method according to claim 2, wherein the numbering format is in the form of a two-bit Gray code.

7. A method according to claim 1, wherein the generating of the token is based on the adjusted read pointer and a previously stored read pointer.

8. A method according to claim 1, wherein the first clock signal has at least one characteristic that is different from a corresponding characteristic of the second clock signal, wherein the at least one characteristic is at least one of; a clock frequency and a clock phase.

9. A method according to claim 1, wherein the token is generated using a finite state machine.

10. A method according to claim 1, comprising adjusting a token counter based on the comparison of the received token and the previously received token.

11. A method according to claim 1, wherein the first domain comprises a first power domain and the second domain comprises a second power domain.

12. A method according to claim 1, wherein the first domain comprises a first voltage domain and the second domain comprises a second voltage domain.

13. Apparatus for transferring data from a first domain, the first domain being constructed and arranged to use a first clock signal, to a second domain, the second domain being constructed and arranged to use a second clock signal that is different from the first clock signal, the apparatus comprising:
   a first-in first-out (FIFO) memory buffer located in the second domain;
   a FIFO write module located in the first domain, the FIFO write module being constructed and arranged to write data to the FIFO memory buffer, wherein the memory butler operates using the first clock signal that is delivered alongside the data from the first domain to the second domain in a source synchronous manner;
   a FIFO read module located in the second domain, the FIFO read module being constructed and arranged to: read, using the second clock signal, the data from the FIFO memory buffer; and adjust a read pointer based on the reading of the data from the FIFO memory buffer;
   a first synchroniser module located in the second domain, the first synchroniser module being constructed and arranged to synchronise the adjusted read pointer with the delivered first clock signal;
   a token generator module located in the second domain, the token generator module being constructed and arranged to generate, using the delivered first clock signal, a token representative of a capacity of the FIFO memory buffer having been made available, the token being based on at least the adjusted read pointer;
   a second synchroniser module located in the first domain, the second synchroniser module being constructed and arranged to receive the token from the second domain and synchronise the token using the first clock signal; and
   wherein the FIFO write module is constructed and arranged to compare the synchronised token with a previously received token;
   wherein the writing of data from the first domain to the FIFO memory buffer in the second domain is controlled based on at least said comparison.

14. Apparatus according to claim 13, wherein the token generator module is arranged to encode the generated token using a numbering format that has a Hamming distance of one between adjacent numbers.

15. Apparatus according to claim 14, comprising a token decoder module constructed and arranged to decode the encoded generated token after synchronisation.

16. Apparatus according to claim 13, comprising an encoding module constructed and arranged to encode the read pointer before synchronisation using a numbering format that has a Hamming distance of one between adjacent numbers.

17. Apparatus according to claim 16, comprising a decoding module constructed and arranged to decode the encoded read pointer after synchronisation.

18. Apparatus according to claim 14, wherein the numbering format is in the form of a two-bit Gray code.

19. Apparatus according to claim 13, wherein the generating of the token is based on the adjusted read pointer and a previously stored read pointer.

20. Apparatus according to claim 13, wherein the first clock signal has at least one characteristic that is different from a corresponding characteristic of the second clock signal, wherein the at least one characteristic is at least one of: a clock frequency and a clock phase.

21. Apparatus according to claim 13, wherein the token generator module comprises a finite state machine constructed and arranged to generate the token.

22. Apparatus according to claim 13, wherein the FIFO write module comprises a token counter constructed and arranged to update the token counter value based on the comparison of the received token and the previously received token.

23. Apparatus according to claim 13, wherein the first domain comprises a first power domain and the second domain comprises a second power domain.

24. Apparatus according to claim 13, wherein the first domain comprises a first voltage domain and the second domain comprises a second voltage domain.

* * * * *